United States Patent
Lin et al.

(10) Patent No.: US 7,269,288 B2
(45) Date of Patent: Sep. 11, 2007

(54) APPARATUS FOR PARALLEL CALCULATION OF PREDICTION BITS IN A SPATIALLY PREDICTED CODED BLOCK PATTERN AND METHOD THEREOF

(75) Inventors: Gong-Sheng Lin, Tai-Chung (TW); Hui-Hua Kuo, Tai-Nan (TW)

(73) Assignee: Mediatek Inc., Hsin-Chu Hsien (TW)

( * ) Notice: Subject to any disclaimer, the term of this patent is extended or adjusted under 35 U.S.C. 154(b) by 826 days.

(21) Appl. No.: 10/604,567

(22) Filed: Jul. 30, 2003

(65) Prior Publication Data
US 2005/0025247 A1 Feb. 3, 2005

(51) Int. Cl.
G06K 9/36 (2006.01)
G06K 9/46 (2006.01)
H04B 1/66 (2006.01)
H04N 7/12 (2006.01)
H04N 11/02 (2006.01)
H04N 11/04 (2006.01)

(52) U.S. Cl. .................. 382/238; 382/234; 348/394.1; 375/240.24

(58) Field of Classification Search ........... 375/240.13, 375/240.24; 382/166, 234, 238, 250; 348/394.1
See application file for complete search history.

(56) References Cited

U.S. PATENT DOCUMENTS

| | | | | |
|---|---|---|---|---|
| 4,469,916 A | * | 9/1984 | de Bergh et al. | 379/108.02 |
| 5,001,560 A | * | 3/1991 | Ericsson | 375/240.14 |
| 5,717,462 A | * | 2/1998 | Hayashi | 375/240.13 |
| 6,012,156 A | * | 1/2000 | Zydek et al. | 714/736 |
| 6,563,953 B2 | * | 5/2003 | Lin et al. | 382/233 |
| 2005/0254605 A1 | * | 11/2005 | Holmes et al. | 375/341 |

\* cited by examiner

*Primary Examiner*—Yubin Hung
(74) *Attorney, Agent, or Firm*—Winston Hsu

(57) ABSTRACT

A storage device stores rows of bits including a D0 bit, an X0 bit, an X1 bit, a Y0 bit, a Y1 bit and a spatially predicted coded block pattern having an A0 bit, an A1 bit, an A2 bit, and an A3 bit. A first circuit is connected to the storage device for setting the A0 bit. A second circuit is connected to the storage device for setting the A2 bit and operates in parallel to the first circuit. In a second clock cycle, the bits in the storage device are shifted and the first circuit and the second circuit are reused to calculate the A1 bit and the A2 bit in parallel. Alternatively, a third circuit and a fourth circuit can be connected to the storage device to calculate the A1 bit and the A2 bit in parallel during the first clock cycle.

20 Claims, 6 Drawing Sheets

APPARATUS FOR PARALLEL CALCULATION OF PREDICTION BITS IN A SPATIALLY PREDICTED CODED BLOCK PATTERN AND METHOD THEREOF

BACKGROUND OF INVENTION

1. Field of the Invention

The invention relates to encoding and decoding digital video signals, and more particularly, to the parallel calculation of prediction bits in a spatially predicted coded block pattern.

2. Description of the Prior Art

Full-motion video displays using analog video signals have long been available in the form of television. With recent advances in computer processing capabilities and affordability, full-motion video displays using digital video signals are becoming more widely available. Digital video systems provide significant improvements over conventional analog video systems in creating, modifying, transmitting, storing, and playing full-motion video sequences.

Digital video displays include large numbers of image frames that are played or rendered successively at frequencies of between 30 and 75 Hz. Each image frame is a still image formed from an array of pixels based on the display resolution of a particular system. As examples, VHS-based systems have display resolutions of 320 pixels wide by 480 pixels high, NTSC-based systems have display resolutions of 720 pixels wide by 486 high, and high-definition television (HDTV) systems have display resolutions of 1360 pixels wide by 1024 pixels high.

The amounts of raw digital information included in video sequences are massive. Storage and transmission of these amounts of video information is infeasible with conventional personal computer equipment. Consider, for example, a digitized form of a relatively low resolution VHS image format having a 320×480 pixel resolution. A full-length motion picture of two hours in duration at this resolution corresponds to 100 gigabytes of digital video information. By comparison, conventional compact optical disks have capacities of about 0.6 gigabytes, magnetic hard disks have capacities of 1-2 gigabytes, and compact optical disks under development have capacities of up to 8 gigabytes.

To address the limitations in storing and transmitting such massive amounts of digital video information, various video compression standards or processes have been established, including MPEG-1, MPEG-2, MPEG-4, and H.26X. These video compression techniques utilize similarities between successive image frames, referred to as temporal or interframe correlation, to provide interframe compression in which motion data and error signals are used to encode changes between frames.

In addition, conventional video compression techniques utilize similarities within image frames, referred to as intraframe correlation, to provide intraframe compression in which the image samples within an image frame are compressed. Intraframe compression is based upon conventional processes for compressing still images, such as discrete cosine transform (DCT) encoding. This type of coding is sometimes referred to as "texture" or "transform" coding. A "texture" generally refers to a two-dimensional array of image sample values, such as an array of chrominance and luminance values or an array of alpha (opacity) values. The term "transform" in this context refers to how the image samples are transformed into spatial frequency components during the coding process. This use of the term "transform" should be distinguished from a geometric transform used to estimate scene changes in some interframe compression methods.

Spatially predicted coded block patterns have been proposed as an improvement to the conventional intraframe coding standards. In a spatially predicted based intraframe, a macroblock includes four luminance blocks and an associated spatially predicted coded block pattern. The coded block pattern has four bits used for indicating which of the luminance blocks in the macroblock are coded in the bitstream using DCT encoding. To encode a spatially predicted coded block pattern, prediction bits for each bit in the coded block pattern are calculated, each bit in the coded block pattern is XORed with its prediction bit, and the resulting bit pattern forms a spatially predicted coded block pattern. A lookup table is used to convert the convert the spatially predicted coded block pattern to a variable length code for transmission or storage. The reverse procedure is used to decode the variable length code. A lookup table is used to convert the variable length code to a spatially predicted coded block pattern. Prediction bits are calculated for each bit in the spatially predicted coded block pattern and each bit in the spatially predicted coded block pattern is then XORed with its prediction bit.

FIG. 1 shows a coded block pattern 100 according to the prior art. The coded block pattern 100 includes an A0 bit, an A1 bit, an A2 bit, and an A3 bit. During the encoding and decoding process of a spatially predicted coded block pattern, a prediction bit must be calculated for each bit in the coded block pattern 100. The prediction bit calculations use a D0 bit, an X0 bit, an X1 bit, a Y0 bit, and a Y1 bit, which are adjacent bits to the coded block pattern 100. The D0 bit, the X0 bit, and the X1 bit indicate which blocks in a first row are coded in the bitstream, the Y0 bit, the A0 bit, and the A1 bit indicate which blocks in a second row are coded in the bitstream, and the Y1 bit, the A2 bit, and the A3 bit indicate which blocks in a third row are coded in the bitstream. There are also additional bits to the left and right in each row and additional rows above and below the three rows shown; but as these bits are not used in the prediction bit calculations, they have been omitted from FIG. 1.

To calculate the prediction bits for A0, A1, A2, A3 the following steps are performed in the order shown:

Step 1.If the X0 bit is equivalent to the D0 bit, the A0 bit is set equal to the Y0 bit, otherwise the A0 bit is set equal to the X0 bit.

Step 2.If the X1 bit is equivalent to the X0 bit, the A1 bit is set equal to the A0 bit, otherwise the A1 bit is set equal to the X1 bit.

Step 3.If the A0 bit is equivalent to the Y0 bit, the A2 bit is set equal to the Y1 bit, otherwise the A2 bit is set equal to the A0 bit.

Step 4.If the A1 bit is equivalent to the A0 bit, the A3 bit is set equal to the A2 bit, otherwise the A3 bit is set equal to the A1 bit.

Because each successive step depends on the result of the previous step, the steps must be executed one after another. When implemented in hardware, this typically means a minimum of four clock cycles to calculate the prediction bits for a coded block pattern 100, one clock cycle being used for each step. It would be beneficial to reduce the required clock cycles, however, if the steps are grouped together using combinatorial logic into a single clock cycle, the time delay from the start of the calculation to the completion of each bit (A0, A1, A2, A3) takes a large number of gate delays and may not meet the timing constraints of a system having a high system clock frequency. Additionally a large amount of gates are used. A faster and more efficient implementation of the prediction bit calculations is needed.

SUMMARY OF INVENTION

It is therefore a primary objective of the claimed invention to provide a method and apparatus for the parallel calculation of the prediction bits in a spatially predicted coded block pattern, to solve the above-mentioned problems.

According to the claimed invention, an apparatus for parallel calculation of prediction bits in a spatially predicted coded bit pattern having an A0 bit, an A1 bit, an A2 bit, and an A3 bit. The apparatus comprises: a storage device storing rows of bits including the spatially predicted coded bit pattern, a D0 bit, an X0 bit, an X1 bit, a Y0 bit, and a Y1 bit. A first circuit is connected to the storage device for setting the A0 bit and a second circuit is connected to the storage device for setting the A2 bit. The first circuit and the second circuit operate in parallel.

According to the claimed invention, a method for parallel calculation of prediction bits in a spatial predicted coded bit pattern having an A0 bit, an A1 bit, an A2 bit, and an A3 bit. The method comprises the following steps: (a) if an X0 bit is equivalent to a D0 bit, setting the A0 bit equal to a Y0 bit and setting the A2 bit equal to a Y1 bit, otherwise setting the A0 bit equal to the X0 bit; (b) if an X1 bit is equivalent to the X0 bit, setting the A1 bit equal to the A0 bit and setting the A3 bit equal to the A2 bit, otherwise setting the A1 bit equal to the X1 bit.

It is an advantage of the claimed invention apparatus that after a first clock cycle, the bits in the storage device can be shifted and the first circuit and the second circuit can be reused for setting the A1 bit and the A3 bit respectively in a second clock cycle.

It is a further advantage of the claimed invention apparatus that a third circuit can be connected to the storage device for setting the A1 bit and a fourth circuit can be connected to the storage device for setting the A3 bit. The first circuit, the second circuit, the third circuit, and the fourth circuit operate in parallel and the A0, A1, A3, and A4 bits are set in a single clock cycle.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
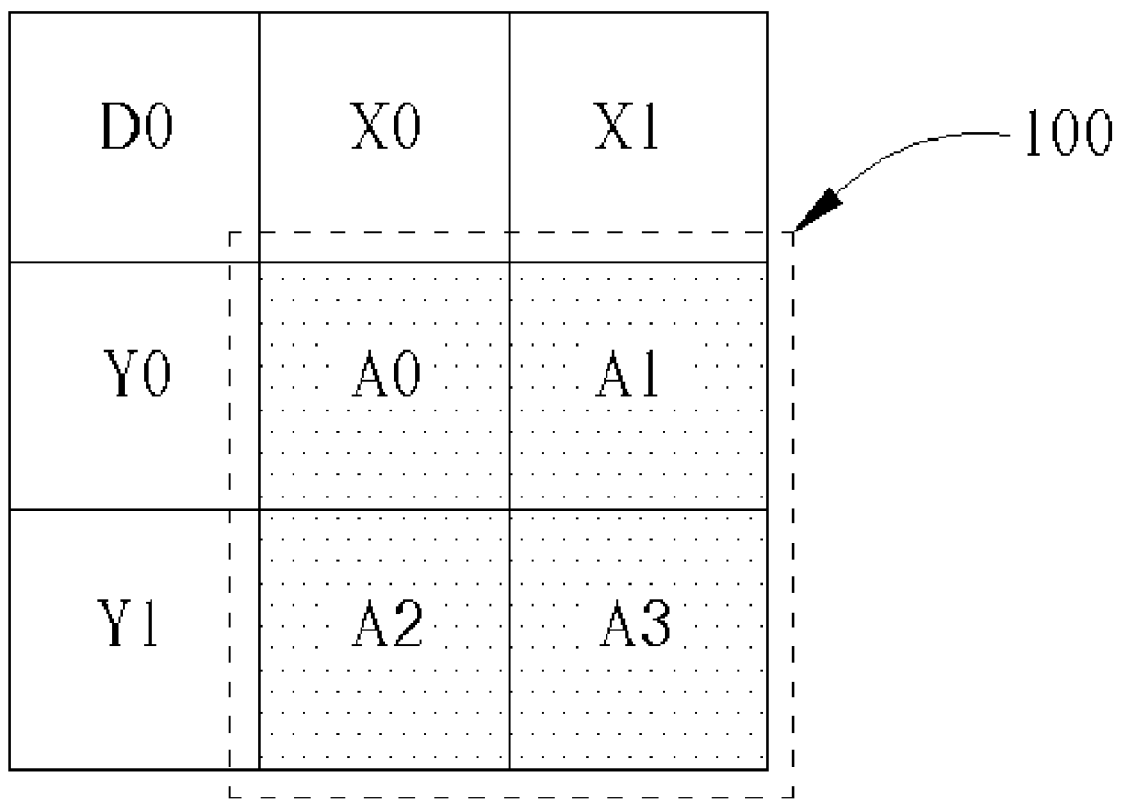
FIG. 1 is a diagram of a coded block pattern and adjacent bits according to the prior art.
Figure 2:
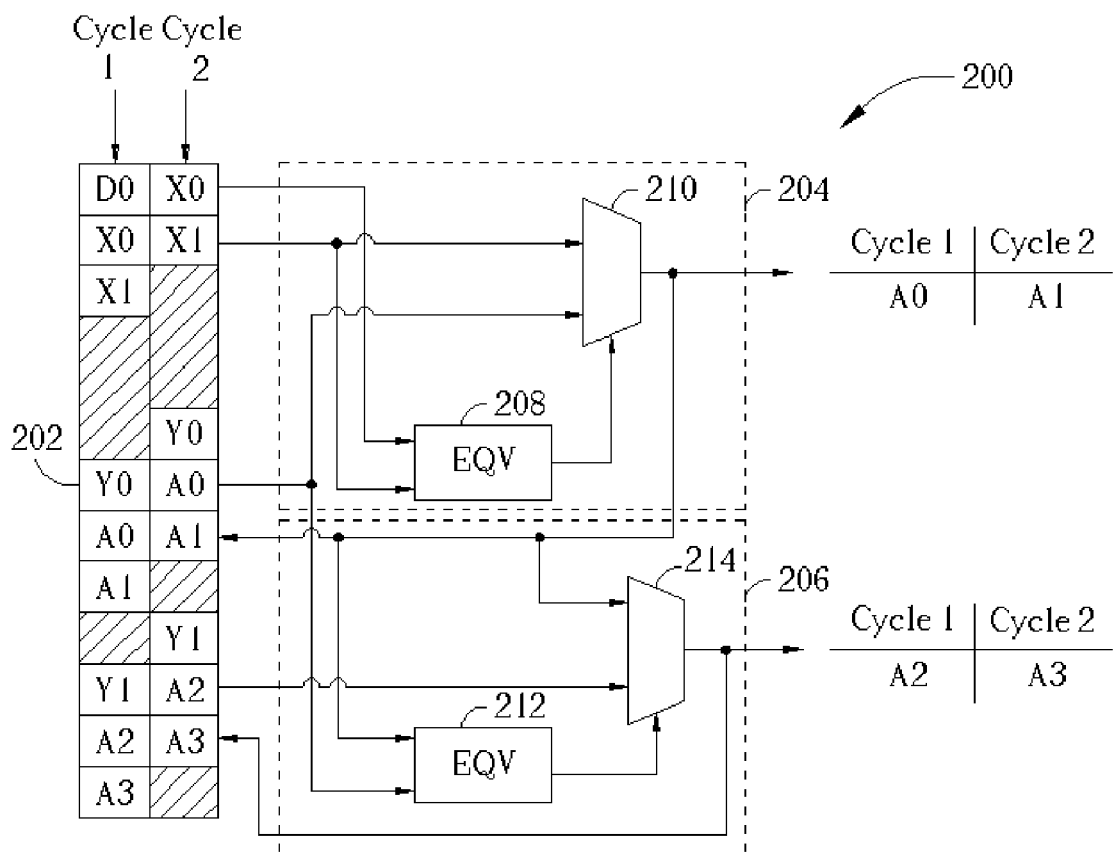
FIG. 2 is a block diagram of a first apparatus for calculating the prediction bits in a spatially predicted coded block pattern in two clock cycles according the first embodiment of the present invention.

FIG. 2 shows a block diagram of a first apparatus 200 for calculating the prediction bits in a spatially predicted coded block pattern 100 in two clock cycles according the first embodiment of the present invention. The first apparatus 200 includes a shift register 202, a first circuit 204 connected to the shift register 202, and a second circuit 206 also connected to the shift register 202. The shift register contains the spatially predicted coded block pattern 100 and the adjacent bits as shown in FIG. 1. It should be noted that although a shift register 202 is used in FIG. 2, this is for example only and any storage device can be used to store the coded block pattern 100 and the adjacent bits. The first circuit 204 is for setting the A0 bit in the coded block pattern 100 during a first clock cycle and for setting the A1 bit in the coded block pattern 100 during a second clock cycle. The first circuit 204 includes a first comparator 208 and a first multiplexer 210. The second circuit 206 is for setting the A2 bit in the coded block pattern 100 during the first clock cycle and for setting the A3 bit in the coded block pattern 100 during the second clock cycle. The second circuit 206 includes a second comparator 212 and a second multiplexer 214. In the first clock cycle, the shift register 202 contains the bits as shown in the column labeled Cycle 1 and in the second clock cycle, the shift register 202 is shifted by one bit as is shown in the column labeled Cycle 2.

In the first clock cycle, the first circuit 204 calculates the A0 bit. The inputs to the first comparator 208 are connected to the D0 bit and the X0 bit in the shift register 202 and the first comparator 208 determines if X0 is equal to D0. The inputs to the first multiplexer are connected to the X0 bit and the Y0 bit of the shift register 202 and the output of the first comparator 208 is used as the select signal of the first multiplexer 210. When X0 is equal to D0, A0 is set to the value of Y0 through the first multiplexer 210. When X0 is not equal to D0, A0 is set to the value of X0 through the first multiplexer 210.

In the first clock cycle, the second circuit 206 calculates the A2 bit in parallel with the first circuit 204. The inputs to the second comparator 212 are connected to the Y0 bit and the A0 bit in the shift register 202 and the second comparator determines if A0 is equal to Y0. The inputs to the second multiplexer 214 are connected to the A0 bit and the Y1 bit of the shift register 202 and the output of the second comparator 212 is used as the select signal of the second multiplexer 214. When A0 is equal to Y0, A2 is set to the value of Y1 through the second multiplexer 214. When A0 is not equal to Y0, A2 is set to the value of A0 through the second multiplexer 214.

In the second clock cycle, the shift register 202 is shifted by one bit as shown in the column labeled Cycle 2 and the first circuit 204 is reused to calculate the A1 bit. The inputs to the first comparator 208 are connected to the X0 bit and the X1 bit in the shift register 202 and the first comparator 208 determines if X1 is equal to X0. The inputs to the first multiplexer are connected to the X1 bit and the A0 bit of the shift register 202 and the output of the first comparator 208 is used as the select signal of the first multiplexer 210. When X1 is equal to X0, A1 is set to the value of A0 through the first multiplexer 210. When X1 is not equal to X0, A1 is set to the value of X1 through the first multiplexer 210.

In the second clock cycle, the second circuit 206 is reused to calculate the A3 bit in parallel with the first circuit 204. The inputs to the second comparator 212 are connected to the A0 bit and the A1 bit in the shift register 202 and the second comparator determines if A1 is equal to A0. The inputs to the second multiplexer 214 are connected to the A1 bit and the A2 bit of the shift register 202 and the output of the second comparator 212 is used as the select signal of the second multiplexer 214. When A1 is equal to A0, A3 is set to the value of A2 through the second multiplexer 214. When A1 is not equal to A0, A3 is set to the value of A1 through the second multiplexer 214.

As is well known to a person skilled in the art, multiplexers and comparators are typically implemented with two levels of logic gates and therefore have a delay of two gate-delays. This means that in the first clock cycle, the A0 bit is stable after four gate-delays and the A2 bit is stable in eight gate-delays. Similarly, in the second clock cycle, the A1 bit is stable after four gate-delays and the A3 bit is stable in eight gate-delays.

Figure 3:
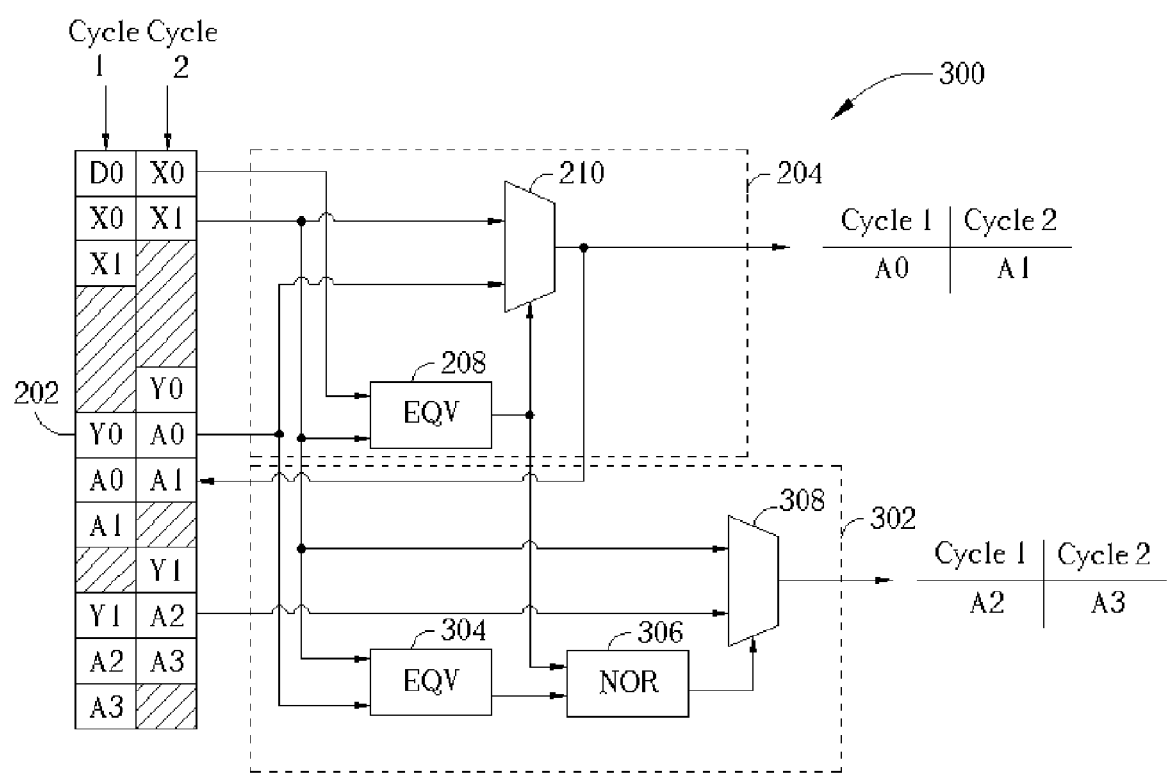
FIG. 3 is a block diagram of a second apparatus for calculating the prediction bits in a spatially predicted coded block pattern in two clock cycles according the second embodiment of the present invention.

FIG. 3 shows a block diagram of a second apparatus 300 for calculating the prediction bits in a spatially predicted coded block pattern 100 in two clock cycles according the second embodiment of the present invention. The second apparatus 300 includes the shift register 202, the first circuit 204 connected to the shift register 202, and a second circuit 302 also connected to the shift register 202. The implementation and operation of the shift register 202 and the first circuit 204 are the same as previously described in the first embodiment shown in FIG. 2 and are therefore not repeated here. In FIG. 3, the second circuit 302 is for setting the A2 bit in the coded block pattern 100 during the first clock cycle and for setting the A3 bit in the coded block pattern 100 during the second clock cycle. The second circuit 302 includes a second comparator 304, a first NOR-gate 306, and a second multiplexer 308.

In the first clock cycle, the second circuit 302 calculates the A2 bit in parallel with the first circuit 204. The inputs to the second comparator 304 are connected to the Y0 bit and the X0 bit in the shift register 202 and the second comparator 304 determines if X0 is equal to Y0. The output of the second comparator 304 and the output of the first comparator 208 are connected as the inputs to the first NOR-gate 306. The inputs to the second multiplexer 308 are connected to the X0 bit and the Y1 bit of the shift register 202 and the output of the first NOR-gate 306 is used as the select signal of the second multiplexer 308. When X0 is not equal to D0 and when Y0 is not equal to X0, A2 is set to the value of X0 through the second multiplexer 308, otherwise A2 is set to the value of Y1 through the second multiplexer 308.

In the second clock cycle, the second circuit 206 is reused to calculate the A3 bit in parallel with the first circuit 204. The inputs to the second comparator 304 are connected to the A0 bit and the X1 bit in the shift register 202 and the second comparator 304 determines if X1 is equal to A0. The output of the second comparator 304 and the output of the first comparator 208 are connected as the inputs to the first NOR-gate 306. The inputs to the second multiplexer 308 are connected to the X1 bit and the A2 bit of the shift register 202 and the output of the first NOR-gate 306 is used as the select signal of the second multiplexer 308. When X1 is not equal to X0 and when A0 is not equal to X1, A3 is set to the value of X1 through the second multiplexer 308, otherwise A3 is set to the value of A2 through the second multiplexer 308.

Because the second circuit 302 does not depend on the output of the first circuit 204, the prediction bits are calculated faster using the second embodiment when compared to the first embodiment shown in FIG. 2. In FIG. 3, in the first clock cycle, the A0 bit is stable after four gate-delays and the A2 bit is stable after five gate-delays. Similarly, in the second clock cycle, the A1 bit is stable after four gate-delays and the A3 bit is stable after five gate-delays. This equates to a 37.5% increase in speed at the cost of an additional NOR-gate 306.

Figure 4:
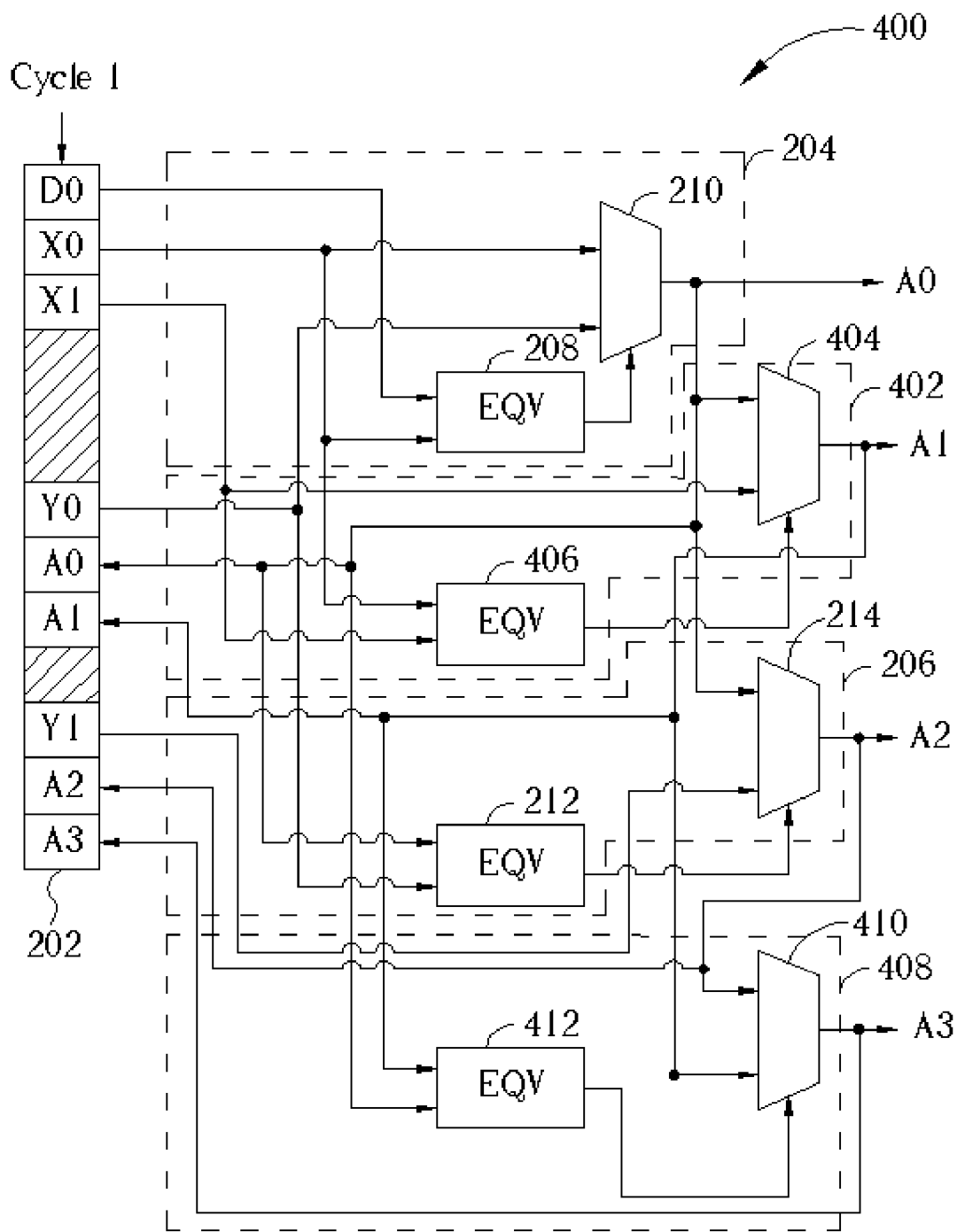
FIG. 4 is a block diagram of a third apparatus for calculating the prediction bits in a spatially predicted coded block pattern in one clock cycle according the third embodiment of the present invention.

FIG. 4 shows a block diagram of a third apparatus 400 for calculating the prediction bits in a spatially predicted coded block pattern 100 in one clock cycle according the third embodiment of the present invention. The third apparatus 400 includes the shift register 202, the first circuit 204 connected to the shift register 202, the second circuit 206 connected to the shift register 202, a third circuit 402 connected to the shift register 202, and a fourth circuit 408 connected to the shift register 202. The implementation and operation of the shift register 202, the first circuit 204, and the second circuit 206 are the same as previously described in the first embodiment shown in FIG. 2 and are therefore not repeated here. In FIG. 4, the third circuit 402 is for setting the A1 bit in the coded block pattern 100 and includes a third comparator 406 and a third multiplexer 404. The fourth circuit 408 is for setting the A3 bit in the coded block pattern 100 and includes a fourth comparator 412 and a fourth multiplexer 410. The first circuit 204, the second circuit 206, the third circuit 402, and the fourth circuit 408 operate in parallel and together calculate the prediction bits (A0, A1, A2, A3) for the coded block pattern 100 in a single clock cycle.

The third circuit 402 calculates the A1 bit. The inputs to the third comparator 406 are connected to the X0 bit and the X1 bit in the shift register 202 and the third comparator 406 determines if X1 is equal to X0. The inputs to the third multiplexer 404 are connected to the X1 bit and the A0 bit of the shift register 202 and the output of the third comparator 406 is used as the select signal of the third multiplexer 404. When X1 is equal to X0, A1 is set to the value of A0 through the third multiplexer 404. When X1 is not equal to X0, A1 is set to the value of X1 through the third multiplexer 404.

The fourth circuit 408 calculates the A3 bit. The inputs to the fourth comparator 412 are connected to the A0 bit and the A1 bit in the shift register 202 and the fourth comparator 412 determines if A1 is equal to A0. The inputs to the fourth multiplexer 410 are connected to the A1 bit and the A2 bit of the shift register 202 and the output of the fourth comparator 412 is used as the select signal of the fourth multiplexer 410. When A1 is equal to A0, A3 is set to the value of A2 through the fourth multiplexer 410. When A1 is not equal to A0, A3 is set to the value of A1 through the first multiplexer 410.

Using the fourth embodiment of the present invention, the prediction bits (A0, A1, A2, A3) are all calculated during the same clock cycle. The A0 bit is stable after four gate-delays, the A1 bit is stable after six gate-delays, the A2 bit is stable after eight gate-delays, and the A3 bit is stable after ten gate-delays.

Figure 5:
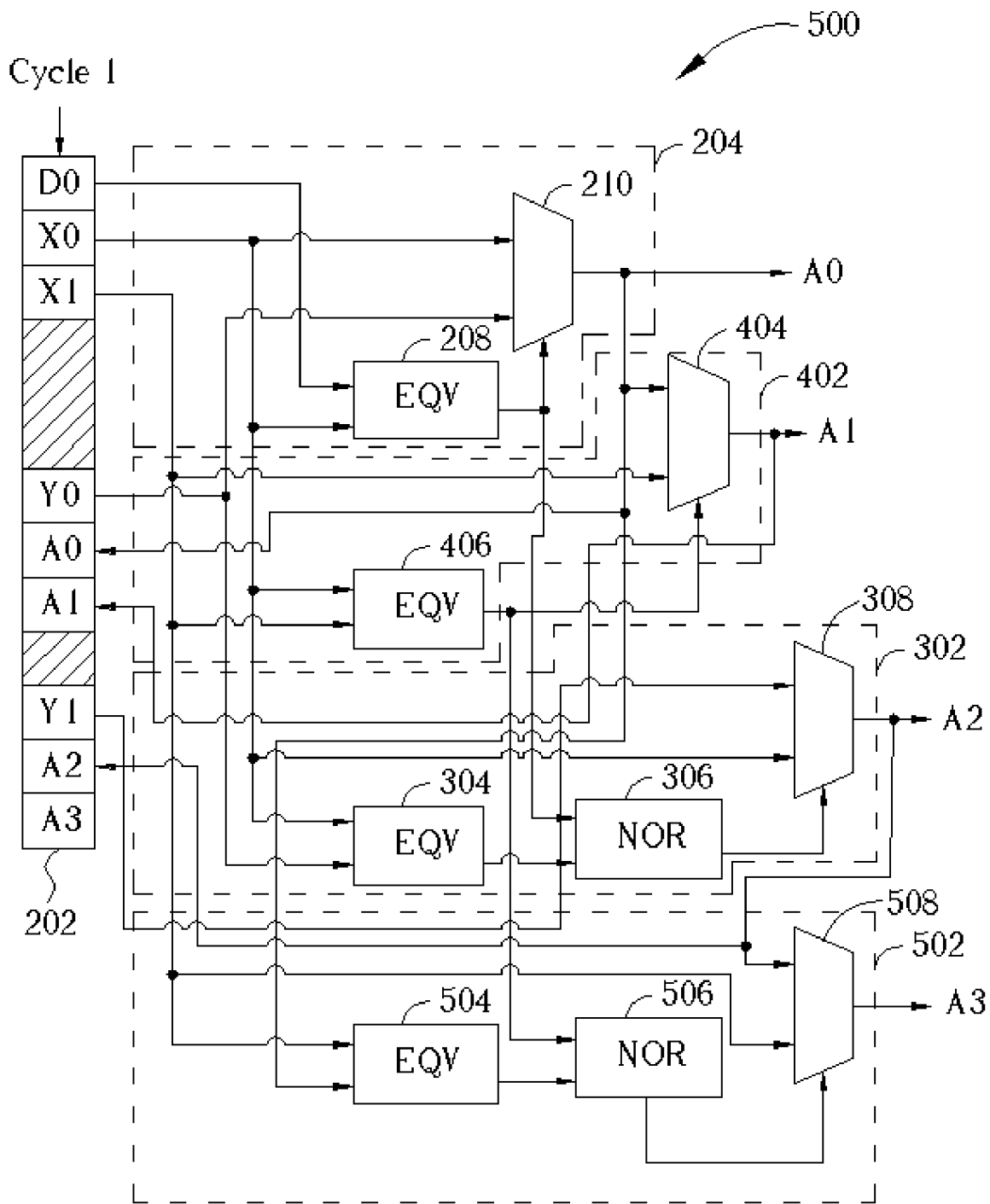
FIG. 5 is a block diagram of a fourth apparatus for calculating the prediction bits in a spatially predicted coded block pattern in one clock cycle according the fourth embodiment of the present invention.

FIG. 5 shows a block diagram of a fourth apparatus 500 for calculating the prediction bits in a spatially predicted coded block pattern 100 in one clock cycle according the fourth embodiment of the present invention. The fourth apparatus 500 includes the shift register 202, the first circuit 204 connected to the shift register 202, the second circuit 302 connected to the shift register 202, the third circuit 402 connected to the shift register 202, and a fourth circuit 502 connected to the shift register 202. The implementation and operation of the shift register 202 and the first circuit 204 are the same as previously described in the first embodiment shown in FIG. 2 and are therefore not repeated here. Likewise, the implementation and operation of the second circuit 302 and the third circuit 402 are the same as previously described in the second and third embodiments shown in FIG. 3 and FIG. 4 respectively and are also not repeated here. In FIG. 5, the fourth circuit 502 is for setting the A3 bit in the coded block pattern 100 and includes a fourth comparator 504, a second NOR-gate 506, and a fourth multiplexer 508. The first circuit 204, the second circuit 302, the third circuit 402, and the fourth circuit 502 operate in parallel and together calculate the prediction bits (A0, A1, A2, A3) for the coded block pattern 100 in a single clock cycle.

The fourth circuit 502 calculates the A3 bit. The inputs to the forth comparator 504 are connected to the A0 bit and the X1 bit in the shift register 202 and the fourth comparator 504 determines if X1 is equal to A0. The output of the fourth comparator 504 and the output of the third comparator 406 are connected as the inputs to the second NOR-gate 506. The inputs to the fourth multiplexer 508 are connected to the X1 bit and the A2 bit of the shift register 202 and the output of the second NOR-gate 506 is used as the select signal of the fourth multiplexer 508. When X1 is not equal to X0 and when A0 is not equal to X1, A3 is set to the value of X1 through the fourth multiplexer 508, otherwise A3 is set to the value of A2 through the fourth multiplexer 508.

Because the second circuit 302 and the fourth circuit 502 do not depend on the output of the first circuit 204 and the third circuit 402 respectively, the prediction bits are calculated faster than the third embodiment shown in FIG. 4. In FIG. 5, the A0 bit is stable after four gate-delays, the A1 bit is stable after 6 gate-delays, the A2 bit is stable after five gate-delays, and the A3 bit is stable after nine gate-delays. This equates to a 10% increase in speed for the A3 bit and a 37.5% increase in speed for the A2 bit at the cost of two additional NOR-gates 306, 506.

Figure 6:
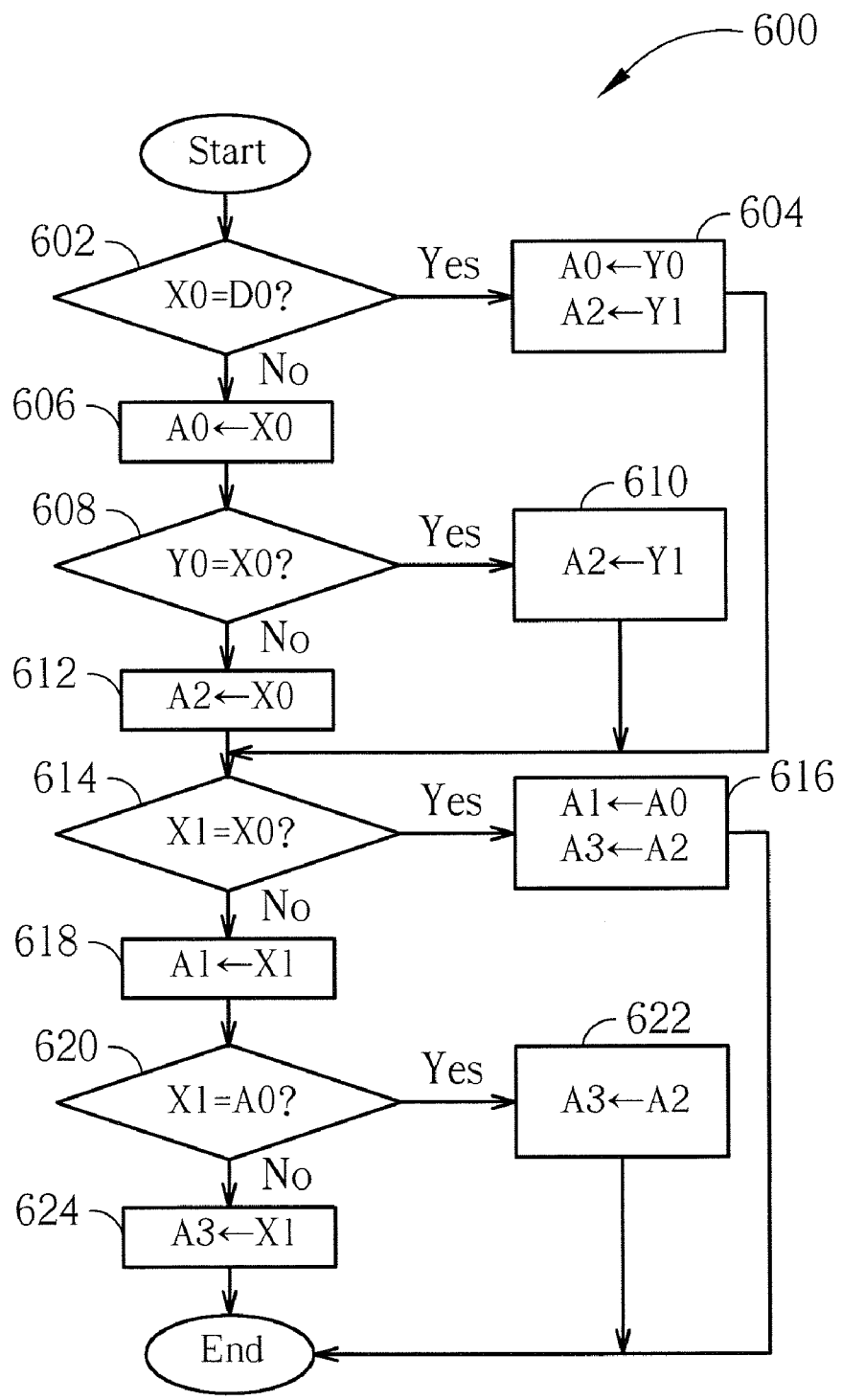
FIG. 6 is a flowchart illustrating a method of calculating the prediction bits in a spatially predicted coded block pattern according the present invention.

FIG. 6 shows a flowchart 600 describing a method of calculating the prediction bits in a spatially predicted coded block pattern 100 according the present invention. The flowchart 600 includes the following steps operating on the a coded block pattern 100:

Step 602: Is the X0 bit equal to the D0 bit? If yes then proceed to step 604, if no then proceed to step 606.

Step 604: Because X0 is equal to D0, the values for the A0 bit and the A2 bit are both known. Set A0 to Y0, set A2 to Y1, and proceed to step 614.

Step 606: Because X0 is not equal to D0, only the value for the A0 bit is known. Set A0 to X0 and proceed to step 608.

Step 608: Is the Y0 bit equal to the X0 bit? If yes then proceed to step 610, if no then proceed to step 612.

Step 610: Set A2 to Y1 and proceed to step 614.

Step 612: Set A2 to X0 and proceed to step 614.

Step 614: Is the X1 bit equal to the X0 bit? If yes then proceed to step 616, if no then proceed to step 618.

Step 616: Because X1 is equal to X0, the values for the A1 bit and the A3 bit are known. Set A1 to A0, set A3 to A2, and end.

Step 618: Because X1 is not equal to X0, only the value for the A3 bit is known. Set A3 to X1 and proceed to step 620.

Step 620: Is the X1 bit equal to the A0 bit? If yes then proceed to step 622, if no then proceed to step 624.

Step 622: Set A3 to A2 and end.

Step 624: Set A3 to X1 and end.

The dependencies on the prediction bits (A0, A1, A2, A3) in flowchart 600 have been minimized allowing for the fastest possible implementation. Given a system clock rate, which defines a timing constraint for each clock cycle, system designers can decide how many of the above steps to execute in parallel in the same clock cycle. A faster clock rate equates to a smaller available time and means that the hardware implementing the steps must stabilize after a smaller number of gate-delays. When implementing the flowchart 600, the maximum delay for the steps implemented in the same clock cycle must not exceed the timing constraint determined by the system clock rate.

In contrast to the prior art, the present invention calculates the prediction bits in a spatially predicted coded block pattern in parallel so that the calculation time is reduced and the number of clock cycles needed to complete the calculation is reduced. By splitting the calculation into two clock cycles, the present invention calculates two of the prediction bits for a coded block pattern in parallel allowing a much higher system clock rate than the prior art and a more efficient solution with minimal components. With the addition of a NOR-gate, a significant performance gain of 37.5% is achieved by eliminating the dependency of the A2 bit on the A0 bit during the first clock cycle and the dependency of the A3 bit on the A1 bit during the second clock cycle. Similarly, if the calculation is executed in a single clock cycle, the present invention calculates the four prediction bits in parallel allowing a high system clock rate and an efficient solution with minimal components. The dependency of the A2 bit on the A0 bit and A3 bit on the A1 bit can be eliminated by adding two NOR-gates to provide a 10% increase in speed for the A3 bit and a 37.5% increase in speed for the A3 bit.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. An apparatus for parallel calculation of prediction bits for a spatially predicted coded block pattern having an A0 bit, an A1 bit, an A2 bit, and an A3 bit, the apparatus comprising:

a storage device storing rows of bits including the spatially predicted coded block pattern, a D0 bit, an X0 bit, an X1 bit, a Y0 bit, and a Y1 bit;

a first circuit connected to the storage device for setting the A0 bit;

a second circuit connected to the storage device for setting the A2 bit;

wherein the first circuit and the second circuit operate in parallel for setting the A0 bit equal to the Y0 bit and setting the A2 bit equal to the Y1 bit if the X0 bit is equivalent to the D0 bit, otherwise setting the A0 bit equal to the X0 bit.

2. The apparatus of claim 1 wherein the storage device comprises a shift register and after a first clock cycle, the shift register is shifted and the first circuit and the second circuit are used for setting the A1 bit and the A3 bit respectively in a second clock cycle.

3. The apparatus of claim 1 wherein the first circuit comprises:

a first comparator connected to the storage device for indicating when the D0 bit and the X0 bit are equivalent; and a first multiplexer connected to the storage device for selectively setting the A0 bit equal to the X0 bit or the Y0 bit depending on the output of the first comparator.

4. The apparatus of claim 3 wherein the second circuit comprises:
a second comparator connected to the storage device for indicating when the X0 bit and the Y0 bit are equivalent;
a first NOR-gate having inputs connected to the output of the first comparator and the output of the second comparator; and
a second multiplexer connected to the storage device for selectively setting the A2 bit equal to the Y1 bit or the X0 bit depending on the output of the first NOR-gate.

5. The apparatus of claim 1 wherein the second circuit comprises:
a second comparator connected to the storage device for indicating when the A0 bit and the Y0 bit are equivalent; and
a second multiplexer connected to the storage device for selectively setting the A2 bit equal to the Y1 bit or the A0 bit depending on the output of the second comparator.

6. The apparatus of claim 1 further comprising:
a third circuit connected to the storage device for setting the A1 bit;
a fourth circuit connected to the storage device for setting the A3 bit;
wherein the first circuit, the second circuit, the third circuit, and the fourth circuit operate in parallel.

7. The apparatus of claim 6 wherein the third circuit comprises:
a third comparator connected to the storage device for indicating when the X0 bit and the X1 bit are equivalent; and
a third multiplexer connected to the storage device for selectively setting the A1 bit equal to the X1 bit or the A0 bit depending on the output of the third comparator.

8. The apparatus of claim 7 wherein the fourth circuit comprises:
a fourth comparator connected to the storage device for indicating when the X1 bit and the A0 bit are equivalent;
a second NOR-gate having inputs connected to the output of the third comparator and the output of the fourth comparator; and
a fourth multiplexer connected to the storage device for selectively outputting the A2 bit or the X1 bit as the A3 bit depending on the output of the second NOR-gate.

9. The apparatus of claim 6 wherein the fourth circuit comprises:
a fourth comparator connected to the storage device for indicating when the A1 bit and the A0 bit are equivalent; and
a fourth multiplexer connected to the storage device for selectively setting the A3 bit equal to the A2 bit or the A1 bit depending on the output of the fourth comparator.

10. A method for parallel calculation of prediction bits in a spatially predicted coded bit pattern having an A0 bit, an A1 bit, an A2 bit, and an A3 bit, the method comprising the following step:
(a) if an X0 bit is equivalent to a D0 bit, setting the A0 bit equal to a Y0 bit and setting the A2 bit equal to a Y1 bit, otherwise setting the A0 bit equal to the X0 bit.

11. The method of claim 10 wherein step (a) further comprises if the A0 bit is not equivalent to the Y0 bit, setting the A2 bit equal to the A0 bit.

12. The method of claim 10 wherein step (a) further comprises if the X0 bit is not equivalent to the D0 bit and the Y0 bit is not equivalent to the X0 bit, setting the A2 bit equal to the X0 bit, otherwise setting the A2 bit equal to the Y1 bit.

13. The method of claim 10 further comprising the following step:
(b) if an X1 bit is equivalent to the X0 bit, setting the A1 bit equal to the A0 bit and setting the A3 bit equal to the A2 bit, otherwise setting the A1 bit equal to the X1 bit.

14. The method of claim 13 wherein step (b) further comprises if the A1 bit is not equivalent to the A0 bit, setting the A3 bit equal to the A1 bit.

15. The method of claim 13 wherein step (b) further comprises if the X1 bit is not equivalent to the X0 bit and the X1 bit is not equivalent to the A0 bit, setting the A3 bit equal to the X1 bit, otherwise setting the A3 bit equal to the A2 bit.

16. The method of claim 13 wherein step (a) is executed in a first clock cycle and step (b) is executed in a second clock cycle.

17. The method of claim 13 wherein step (a) and step (b) are executed in parallel in the same clock cycle.

18. An apparatus for parallel calculation of prediction bits for a spatially predicted coded block pattern having an A0 bit, an A1 bit, an A2 bit, and an A3 bit, the apparatus comprising:
a storage device storing rows of bits including the spatially predicted coded block pattern, a D0 bit, an X0 bit, an X1 bit, a Y0 bit, and a Y1 bit;
a first circuit connected to the storage device for setting the A0 bit;
a second circuit connected to the storage device for setting the A2 bit;
wherein the first circuit and the second circuit operate in parallel; and
the storage device comprises a shift register and after a first clock cycle, the shift register is shifted and the first circuit and the second circuit are used for setting the A1 bit and the A3 bit respectively in a second clock cycle.

19. An apparatus for parallel calculation of prediction bits for a spatially predicted coded block pattern having an A0 bit, an A1 bit, an A2 bit, and an A3 bit, the apparatus comprising:
a storage device storing rows of bits including the spatially predicted coded block pattern, a D0 bit, an X0 bit, an X1 bit, a Y0 bit, and a Y1 bit;
a first circuit connected to the storage device for setting the A0 bit;
a second circuit connected to the storage device for setting the A2 bit;
wherein the first circuit and the second circuit operate in parallel;
the first circuit comprises:
a first comparator connected to the storage device for indicating when the D0 bit and the X0 bit are equivalent; and
a first multiplexer connected to the storage device for selectively setting the A0 bit equal to the X0 bit or the Y0 bit depending on the output of the first comparator; and
the second circuit comprises:
a second comparator connected to the storage device for indicating when the X0 bit and the Y0 bit are equivalent;

a first NOR-gate having inputs connected to the output of the first comparator and the output of the second comparator; and a second multiplexer connected to the storage device for selectively setting the A2 bit equal to the Y1 bit or the X0 bit depending on the output of the first NOR-gate.

20. An apparatus for parallel calculation of prediction bits for a spatially predicted coded block pattern having an A0 bit, an A1 bit, an A2 bit, and an A3 bit, the apparatus comprising:

a storage device storing rows of bits including the spatially predicted coded block pattern, a D0 bit, an X0 bit, an X1 bit, a Y0 bit, and a Y1 bit;

a first circuit connected to the storage device for setting the A0 bit;

a second circuit connected to the storage device for setting the A2 bit;

a third circuit connected to the storage device for setting the A1 bit; and a fourth circuit connected to the storage device for setting the A3 bit;

wherein the third circuit comprises:

a third comparator connected to the storage device for indicating when the X0 bit and the X1 bit are equivalent; and a third multiplexer connected to the storage device for selectively setting the A1 bit equal to the X1 bit or the A0 bit depending on the output of the third comparator;

the fourth circuit comprises:

a fourth comparator connected to the storage device for indicating when the X1 bit and the A0 bit are equivalent;

a second NOR-gate having inputs connected to the output of the third comparator and the output of the fourth comparator; and a fourth multiplexer connected to the storage device for selectively outputting the A2 bit or the X1 bit as the A3 bit depending on the output of the second NOR-gate; and the first circuit, the second circuit, the third circuit, and the fourth circuit operate in parallel.

\* \* \* \* \*